(12) United States Patent
Sinclair et al.

(10) Patent No.: US 11,178,844 B2
(45) Date of Patent: Nov. 23, 2021

(54) YOGURT STRAINING SYSTEM AND DEVICE

(71) Applicants: Sofia A. Sinclair, Portsmouth, RI (US); James D Sinclair, Portsmouth, RI (US)

(72) Inventors: Sofia A. Sinclair, Portsmouth, RI (US); James D Sinclair, Portsmouth, RI (US)

( * ) Notice: Subject to any disclaimer, the term of this patent is extended or adjusted under 35 U.S.C. 154(b) by 0 days.

(21) Appl. No.: 16/873,429

(22) Filed: Apr. 10, 2020

(65) Prior Publication Data

US 2021/0315182 A1 Oct. 14, 2021

(51) Int. Cl.
*A47J 36/18* (2006.01)
*A01J 11/06* (2006.01)
*A23C 9/12* (2006.01)

(52) U.S. Cl.
CPC .............. *A01J 11/06* (2013.01); *A23C 9/1226* (2013.01); *A23C 2260/05* (2013.01)

(58) Field of Classification Search
CPC ..... A01J 11/06; A23C 9/1226; A23C 2260/05
USPC .......................................................... 426/34
See application file for complete search history.

(56) References Cited

U.S. PATENT DOCUMENTS

| 5,373,779 A * | 12/1994 | Grusin | .................. | B01D 29/23 99/458 |
| 2013/0125765 A1* | 5/2013 | Difante | .................. | A47J 36/20 99/403 |

FOREIGN PATENT DOCUMENTS

| CN | 1951266 A | * | 4/2007 |
| CN | 201996388 U | * | 10/2011 |

OTHER PUBLICATIONS

Translation of Huang (CN-1951266-A) (Year: 2007).*
Translation of (CN-201996388-U) (Year: 2011).*

* cited by examiner

*Primary Examiner* — Brent T O'Hern
(74) *Attorney, Agent, or Firm* — Robert J Doherty

(57) ABSTRACT

The present invention comprises a rigid device capable of separating whey from yogurt when inserted into yogurt. The bottom of the device and a portion of the lower sides are walled to a height great enough to create a whey collecting reservoir. An accompanying ladle which fits within the device and is at a sufficient height to allow the collection of liquid into the ladle when inserted in the device may be included as part of a sales package.

6 Claims, 8 Drawing Sheets

Straining Device Front/Side View Diagram

Straining Device Top View Diagram

Ladle Side View Diagram

Top View Ladle

YOGURT STRAINING SYSTEM AND DEVICE

This application claims the benefit of U.S. Provisional Patent Application No. 62/836,369 entitled Insertable Yogurt Straining Device filed Apr. 19, 2019.

FIELD OF THE INVENTION

The present invention relates to a universal system (method) and a device for separating and collecting whey from yogurt. More particularly, the invention relates to a device that is capable of separating whey from yogurt in place without removing the yogurt from the container in which the yogurt was made. The present invention includes a yogurt straining device insertable into yogurt within a container and a device such as a ladle to remove the collected whey from a container.

BACKGROUND OF THE INVENTION

Yogurt is a food enjoyed in many nations. In the United States from 2012 to 2017, yogurt sales have increased reaching over nine billion U.S. dollars in 2017. Many consumers make yogurt at home, which is a cost-effective way to enjoy yogurt.

Most consumers use a typical stove top pot or a slow cooker, crockpot or a pressure cooker to make yogurt. Homemade yogurt remains fresh for up to two weeks in the refrigerator, therefore making one gallon at a time is a logical and time saving process.

The following is a typical yogurt making process:
Pour milk into a suitable container and slowly bring the milk's temperature up to at least 180° F. while stirring frequently. Be sure not to scorch the milk or allow the milk to come to a boil.
Allow the milk to cool to approximately 115° F.
Whisk yogurt with live culture or fresh starter culture until the live or starter culture is completely incorporated. Cover the yogurt and incubate the yogurt to maintain a steady temperature for 8 to 12 hours.

Whey is a byproduct of yogurt. Whey separates from yogurt naturally or can be actively separated from yogurt via various methods to ultimately thicken the yogurt. Even if the whey is not actively separated from the yogurt, the whey will separate naturally. Once yogurt is cut, that is, a portion of the yogurt removed, whey will begin to collect in the void created by the cut, e.g., by removing spoonfuls of yogurt from the container. This whey must either be drained or mixed in with the remaining yogurt depending on the consumer's desired consistency. Not draining the whey results in a watery yogurt consistency. Most consumers prefer to strain homemade yogurt in order to keep the yogurt at a thicker consistency. Whey is a nutritious byproduct of yogurt and can be collected and used for various purposes such as adding to smoothies, as a starter for soups, as a cooking liquid for soups and vegetables and for various other purposes.

There are several products currently on the market to separate whey from yogurt, each having drawbacks.
One way to strain yogurt is to place a fine mesh strainer over another large bowl and line the strainer with a double layer of paper towels. Scoop the yogurt into the paper lined strainer and place in the refrigerator.
When the strained yogurt is removed from the refrigerator, the whey will have drained to the bottom of the bowl. Transfer the yogurt to a bowl and mix well.

Cheesecloth is often used to separate whey from yogurt. Cheesecloth can be placed over a colander that is then placed over a bowl to collect the whey that drains out. Once the straining process is complete, the yogurt must be transferred again to a separate serving container. This method has several drawbacks. One of the drawbacks is the necessity to remove the yogurt from the container or pot in which the yogurt was originally started in order to pour the yogurt into the cheesecloth-lined colander for straining. The pot used to make the yogurt is usually heavy and difficult to lift in order to pour the yogurt into a secondary container in addition to some yogurt loss. Another drawback is the entire process of draining can take up to twenty-four (24) hours. It is also difficult to assemble all these items in a manner that can be easily stored in a refrigerator or on a countertop during the straining process. This set up may take an excessive amount of space and may be unstable, lending itself to the potential for spills. This method also creates additional cleanup due to the introduction of the cheesecloth, the additional container used for straining, the bowl used to collect the whey and finally the serving container used to store the strained yogurt: Cleaning the cheesecloth is also rather challenging because the yogurt adheres to the cloth fibers making it difficult to remove the residue and may result in wasting the yogurt that was unable to be scraped from the cheesecloth.

Another common method for separating whey from yogurt is using a nut milk bag. With this method, a nut milk bag is suspended typically by a drawstring, and the whey drains below into a collecting pot or bowl. Once the straining process is complete the user must move the yogurt to a separate serving container. This method also has several drawbacks. One of the drawbacks or disadvantages is the necessity to remove the yogurt from the container in which the yogurt process was originally started in order to pour the yogurt into the nut milk bag. Again, the pot used to make the yogurt will be heavy and difficult to lift in order to pour the yogurt into the nut milk bag. Also, nut milk bags are not typically sized to hold a full gallon of yogurt therefore limiting the yogurt able to be strained to less than a gallon. Another disadvantage is the entire process of draining the whey is time consuming, that is, the draining process can take up to twenty-four (24) hours. It is also difficult to find a place to suspend the nut milk bag. It is also difficult to assemble the bag and collection bowl in a manner that can be easily stored in a refrigerator or on a countertop during the straining process. This set up may take an excessive amount of space and may be unstable lending itself to the potential for spills. This method also creates additional cleanup due to the introduction of the cheesecloth, the additional bowl used to collect the whey, and finally the serving container used to store the strained yogurt. The cleanup of the nut milk bag is also rather challenging because the yogurt adheres to the cloth fibers making it difficult to remove the residue and may result in wasting the yogurt that was unable to be scraped from the bag.

Another product exists on the market which serves the purpose of separating whey from yogurt. U.S. Design Pat. No. D731,861 to Farshid Partiyeli issued Jun. 16, 2015 discloses a Greek yogurt strainer or maker consisting of a mesh strainer nested in a collection bowl. This is a simplified solution which solves some of the drawbacks of the aforementioned methods; however, the Partiyeli device has drawbacks as well. One such drawbacks is the necessity to remove the yogurt from the initial container the yogurt was made in. Also, the pot utilized to make the yogurt will be heavy and difficult to lift in order to pour the yogurt into the mesh strainer. This product is also limited to holding only two (2) quarts of yogurt—therefore; the user is limited to less than a gallon of yogurt able to be strained. The yogurt is suspended in the mesh strainer and must remain over the bowl the entire time the yogurt is straining; therefore, the user is unable to make use of the whey until the entire straining process is complete that may take up to twenty-four (24) hours.

Accordingly, a need exists to actively separate whey from yogurt using a simplified process and without the limitations encountered when using the existing methods and/or products currently available.

It is an object of the present invention to provide a universal device to separate whey from yogurt within the container the yogurt was initially made along with a collection accessory such as a ladle to remove or otherwise extract the collected whey from the device.

Another object of the invention is to eliminate the need to transfer a large volume of yogurt from the container the yogurt was originally made in during the yogurt making process.

Another object of the invention is to allow for a greater volume of yogurt to be concurrently strained.

Another object of the invention is to reduce the introduction of additional collecting and serving bowls during the yogurt straining process. A further object of the invention is to eliminate the need for additional storage space required in a refrigerator or on a countertop in order to strain yogurt.

Another object is to allow for access and use of the straining whey without waiting for the entire straining process to be complete.

Other objects, features and advantages of the invention shall become apparent as the description thereof proceeds when considered in connection with the accompanying illustrative drawings.

BRIEF SUMMARY OF THE INVENTION

The present invention overcomes the disadvantages apparent in the existing methods and products commercially available. The present invention provides a universal insertable straining device (hereinafter referred to as a "device", "strainer" and/or "straining device") which separates the whey from yogurt within the same container utilized to make the yogurt and is compatible with most pots, slow cookers, crockpots, pressure cookers and other commercially available dedicated yogurt making devices along with an accompanying whey removal accessory such as a ladle. Generally, the device of the present invention to is configured in a hollow (preferably cylindrical) shape having a bottom wall and upstanding side walls terminating in an open top. The side walls are perforated or covered with a straining medium having micron-count openings sufficient to only allow the liquid whey to pass therethrough. The bottom of the device and preferably a portion of the lower sides are solid, that is, imperforate, up to an appropriate height to create a reservoir to contain the remaining strained whey once the device is removed from the thickened yogurt. There is an accompanying collection accessory such as a ladle that fits within the device positioned to an adequate depth to allow the collection of liquid into the ladle when the ladle is inserted into the device. Other methods of removing the whey collected in the strainer such as inserting a suctioning device, e.g., a common kitchen baster utensil, into the strainer to extract what amount of whey from the pot that has collected in the strainer bottom area up to that point may be used as well.

Advantages of the present invention include its universal design that allows for use with most pots commonly utilised for making yogurt. The device of the present invention eliminates the need for additional receiving and serving containers for the yogurt and allows for a larger amount of yogurt to be strained at the same time. In addition, the consumer does not have to wait to use the collected whey, and the entire process is less labor intensive resulting in less cleanup.

DESCRIPTION OF THE DRAWINGS

In the drawings which illustrate the best mode presently contemplated for carrying out the present invention.

DETAILED DESCRIPTION OF THE INVENTION

Figure 1:
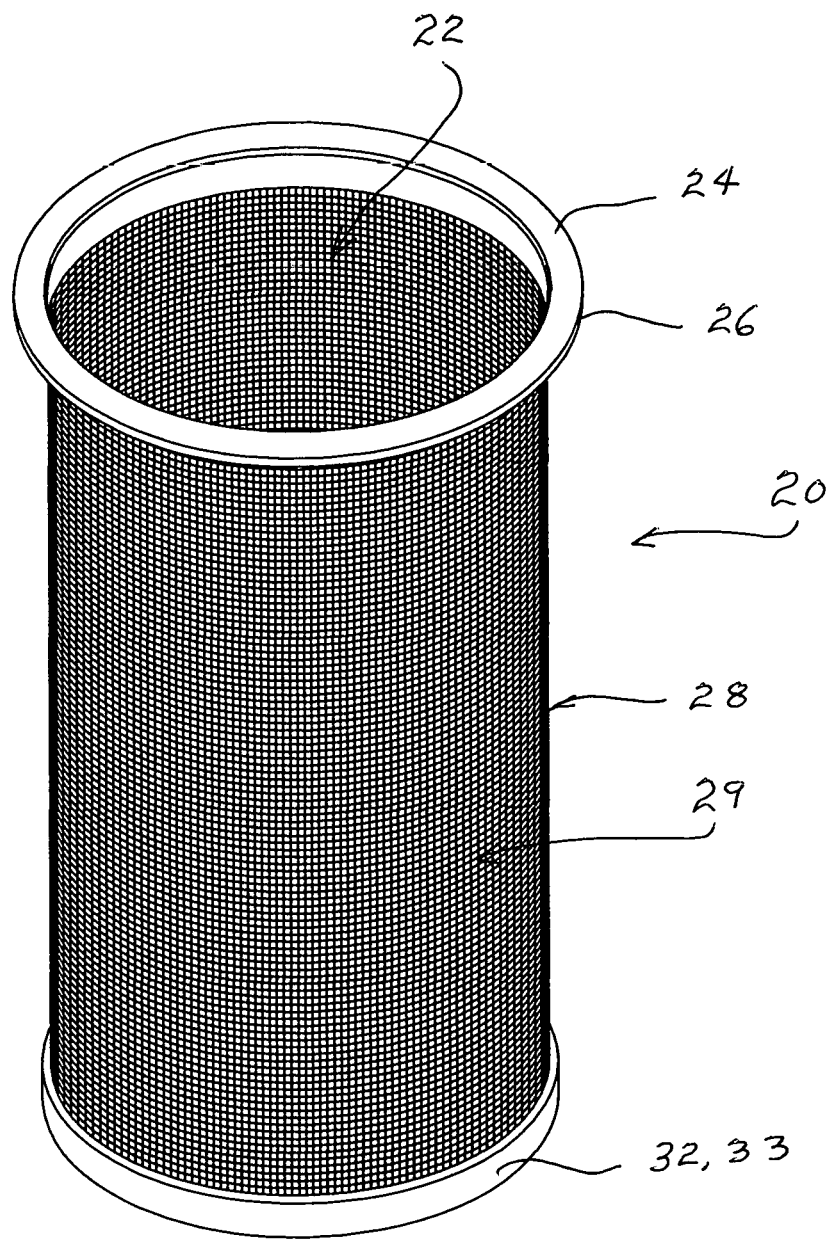
FIG. 1 shows a perspective front view of the strainer of the present invention.
Figure 2:
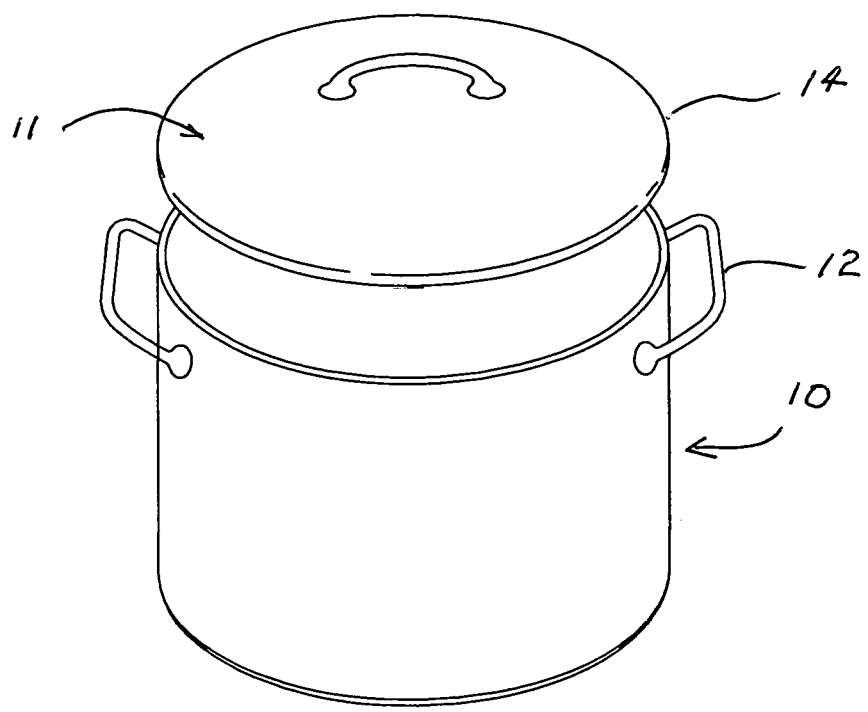
FIG. 2 shows a container or pot in which the yogurt is formed as by fermentation, strained and stored.
Figure 3:
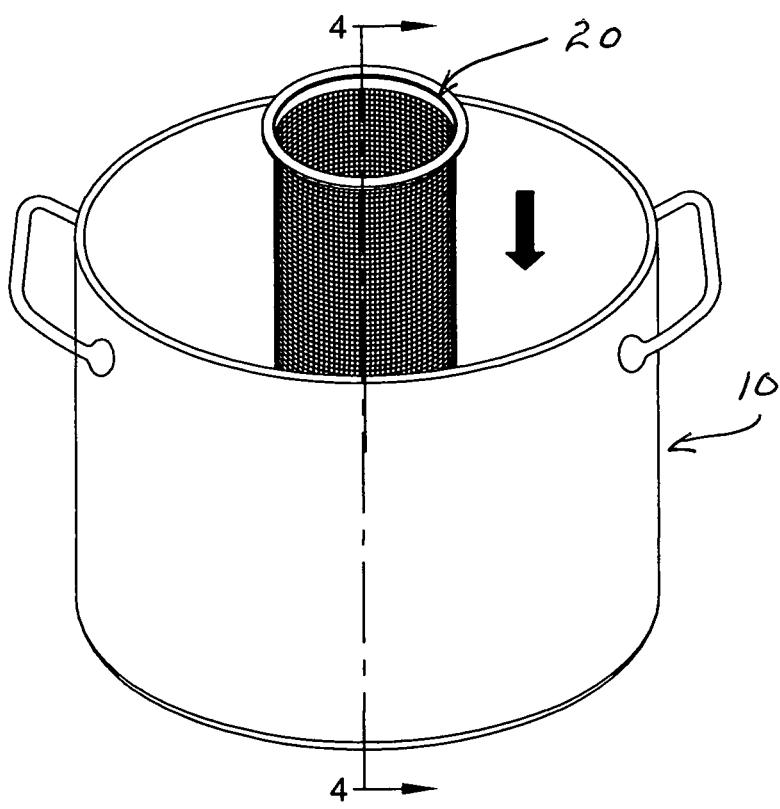
FIG. 3 shows the strainer of FIG. 1 partially inserted into the container and thus into the yogurt mass contained therein.
Figure 4:
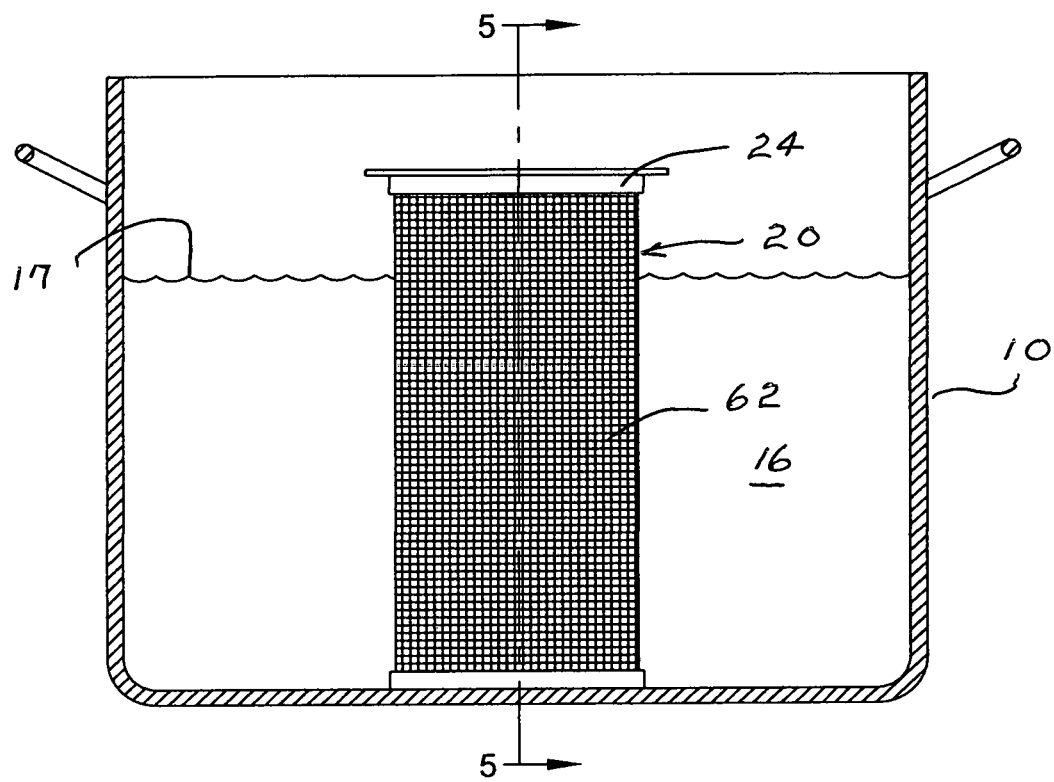
FIG. 4 is a sectional view thru line 4-4 of FIG. 3.
Figure 5:
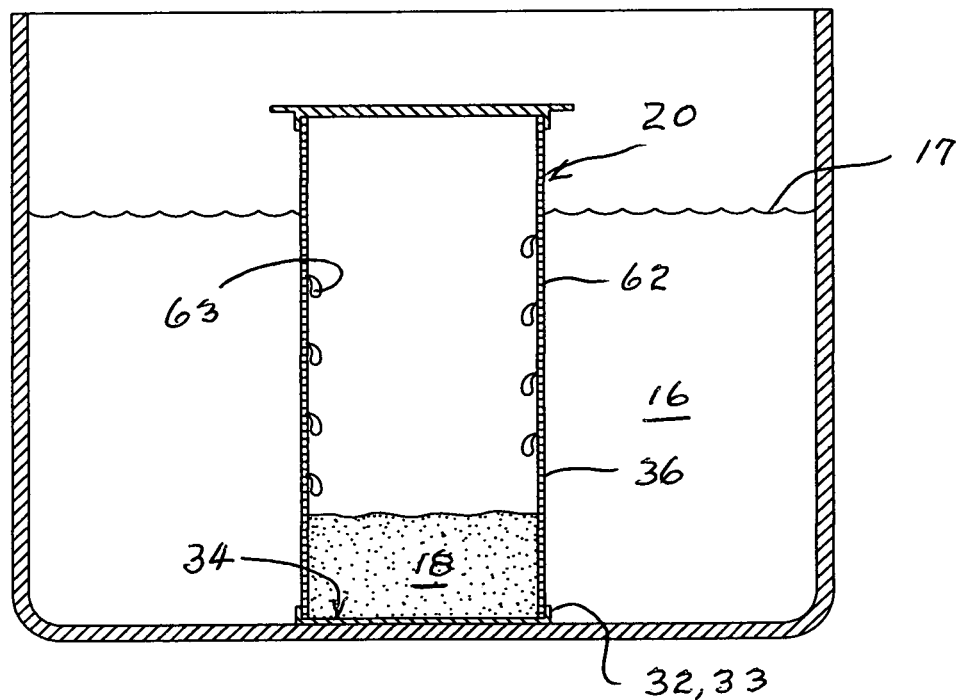
FIG. 5 is an enlarged version of FIG. 4 and shows whey moving through the upper side walls openings in the form of droplets and flowing downwardly to accumulate in the cup portion of the strainer.
Figure 5A:
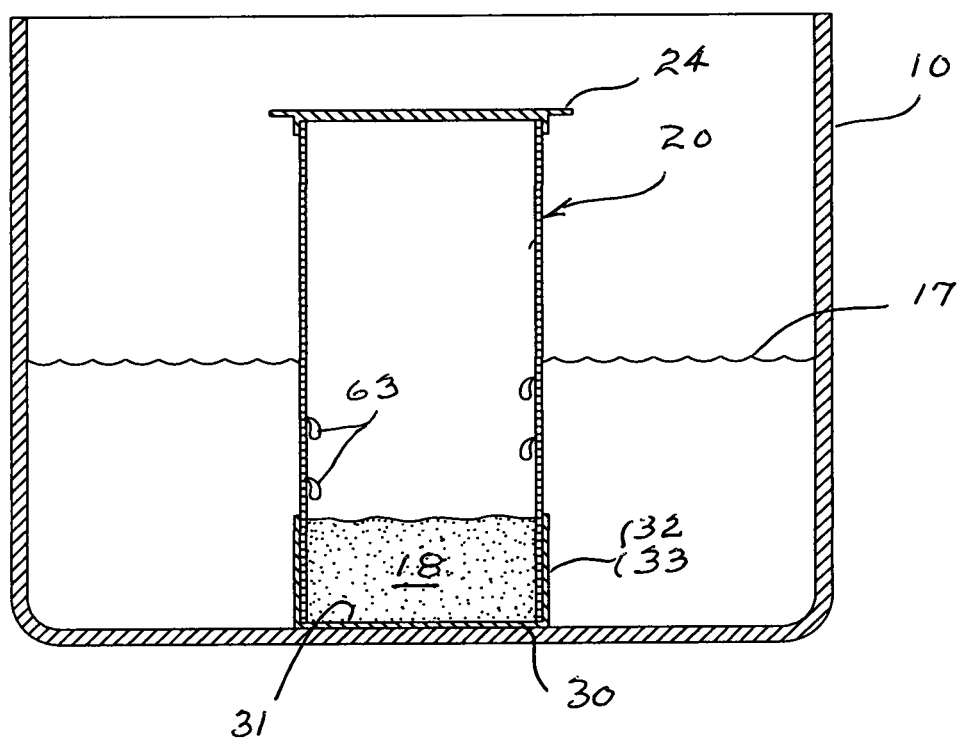
FIG. 5A is a view similar to FIG. 5 but with the flange 33 extending further upwardly.

Turning now to the drawings, a container 10 is shown. The container 10 is preferably of one-gallon capacity including handles 12 and a lid or cover 14. It is in this container 10 that the ingredients for producing the yogurt mass 16 (milk, live yogurt or live culture and flavorings, if desired) are placed and the ingredients heated and then cooled in accordance with the aforementioned recipe process to activate the fermentation action wherein the milk is transformed into lactic acid and ultimately to yogurt and whey. Once the yogurt, that is, the relatively solid yogurt and the more fluid watery whey 18, is formed, it is generally desirable to remove at least some of the accumulating whey as the whey separates from the yogurt thus producing a firmer yogurt product that is commonly preferred. As previously indicated, this is the point in prior art methods where the yogurt mass 16 is transferred to a different container or vessel which has the capability to strain the yogurt mass. However in the present process, the filter 20 is utilized for this procedure and thus enables the use of the original container 10 throughout the entire yogurt making process and thus reducing the inconvenience and possible hazards of handling the heavy container 10.

Such filter 20 is preferably of an overall cylindrical configuration and includes an open top 22 defined by a circular plate 24 having a peripheral edge 26 that extends slightly beyond the overall extent of the body 28. The body 28 is preferably formed of rigid stainless-steel mesh for ease in washing. The mesh may have a weave 29 often referred to as a Dutch weave or plain weave. The body 28 terminates in a closed bottom defined by bottom wall 30. The body 28 includes a minor imperforate side wall portion 32 extending upwardly from the bottom wall 30 and which together with the bottom wall 30 forms a cup 34. A major perforate side wall portion 36 extends upwardly from the minor side wall portion 32 and is connected at the top thereof to the circular plate 24. The perforate side wall portion 36 includes multiple openings defined by the open mesh construction which are of an extent to permit liquid whey to pass therethrough while blocking the more solid yogurt mass 16 confined within the container 10. The side walls are perforated or covered with a straining medium having micron-count openings sufficient to only allow the liquid whey to pass therethrough. An operable range has been found to be between approximately 75 microns and 200 microns although other ranges maybe possible so long as the perforation size allows the liquid whey to pass therethrough as above described. The mesh utilized may be that material manufactured by The Mesh Company or Dorstener Wire Tech Inc. under the product designation wire cloth.

Preferably for ease in construction, the sidewall portions are both formed by a continuous run of the wire cloth that has been formed into a stable cylindrical configuration and then the top and bottom walls attached thereto. Also, the imperforate peripheral flange 33 upwardly extending from the bottom wall snugly engages a lower portion of the body 28 thus blocking the openings of the wire cloth to form the cup 34 along with the bottom wall 30. With this form of construction, the depth of the cup 34 can be varied simply by increasing or decreasing the height of the flange 33.

It should also be pointed out that the size, that is, the diameter of the filter, can be varied. When utilizing a large diameter filter, the larger extent of the filter will exert a greater displacement force upon the yogurt mass and thus increase both the volume of the internal reservoir and the speed at which the liquid whey enters the reservoir.

When the fermentation process of the yogurt mass 16 within the container 10 is underway or completed, the strainer or filter 20 is utilized to separate much of the whey 18 from such yogurt mass 16. The filter 20 is positioned above the yogurt mass 16 with the bottom wall 30 proximate the yogurt mass 16 top surface 17 and then the strainer or filter 20 pushed or otherwise forced down thereinto such yogurt mass 16. This action forces, i.e., displaces, part of the yogurt mass 16 to the sides of the container 10 and sets up counter forces within the yogurt mass 16 that exerts force against the body of the strainer or filter 20. This action promotes and enhances the tendency of the whey 18 to pass through the openings 62 present in the major perforate side wall portions 36 of the filter strainer or filter 20. The whey 18 then runs or otherwise travels down the inner surfaces of the perforate side walls 36 generally in the form of droplets 63 and into the strainer 20 where the whey 18 can be periodically collected as with a ladle or other device 70.

It should be noted that in some instances the yogurt mass 16 has a tendency to exert an upwardly force upon the strainer 20; and, accordingly, it is preferable to size the height of the strainer 20 with reference to the container 10 such that the lid 14 of the container 10 acts as a stop to keep the strainer 20 in place within the yogurt mass 16.

Such ladle 70 includes a handle 72 of a length greater than the height of the strainer. The ladle 70 terminates in a bowl 74 of a height less than that of the cup 34. As the whey 18 accumulates in the cup 34, the ladle 70 is manipulated thereinto to obtain and then remove the whey 18 from the cup 34. Such procedure is periodically performed until as much of the whey 18 is removed to achieve the desired yogurt consistency. Other means to extract the whey 18 accumulating in the cup 34 could be used, e.g., a kitchen basting bulb utensil or other suctioning device. Also, some whey 18 would accumulate on the upper surface 31 of the bottom wall 30 which, in effect, would in part define a collection surface even without a receiving cup 34 as defined above but removal of such accumulated whey 18 with such configuration would be much less efficient. The inclusion of the cup has the advantage that when the filter 20 as opposed to a ladle is removed from the yogurt mass, the collected liquid whey within the cup will not spill from the collection surface.

The container 10 is thus used throughout the entire process as well as for transferring the yogurt to smaller dishes for consumption.

Figure 6:
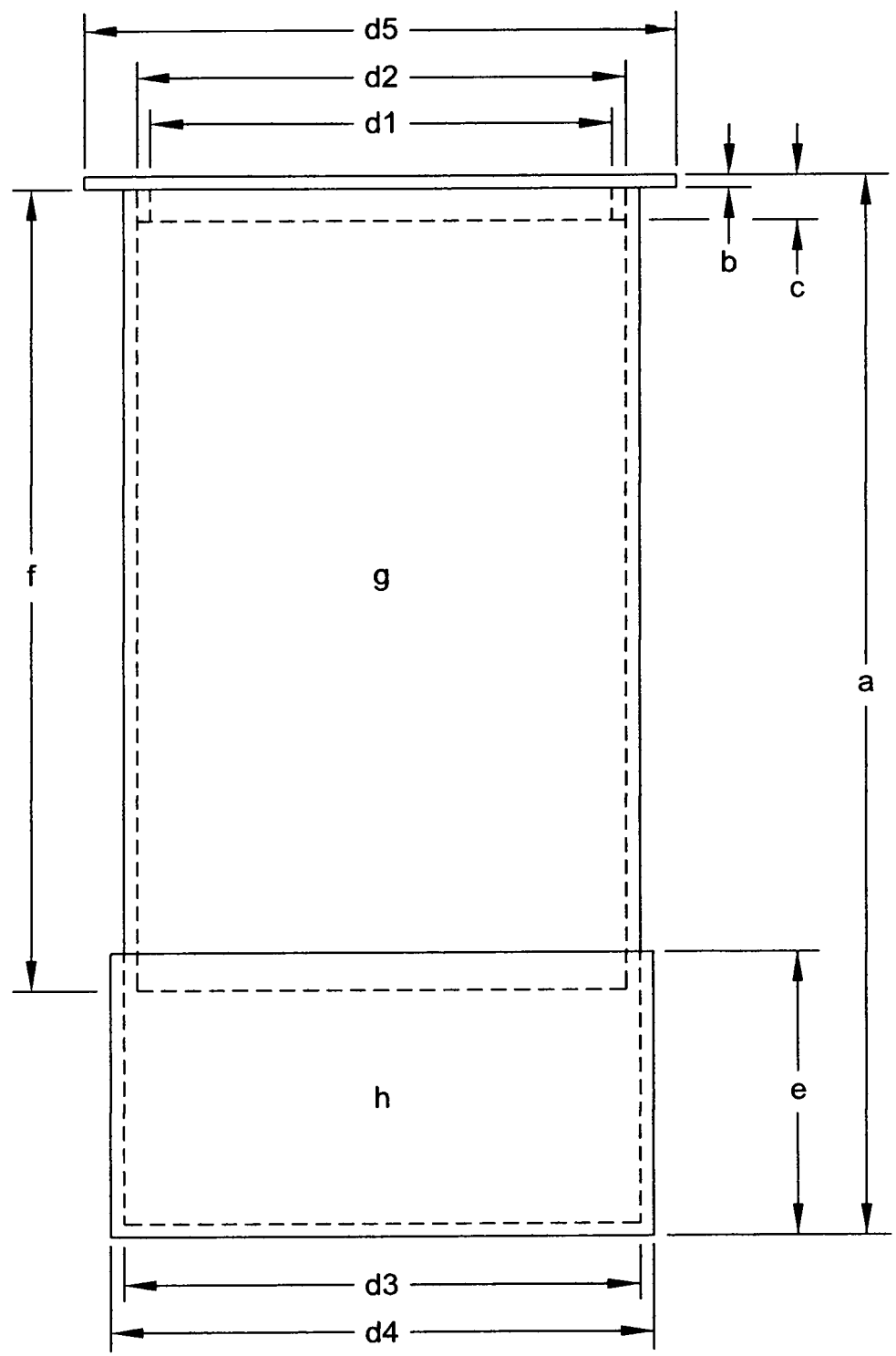
FIG. 6 depicts a front and side view of a preferred embodiment of the device. The front and side view are identical due to the identical front and side views of a preferred cylindrically-shaped embodiment.

In the straining device front/side view diagram, FIG. 6 defines an overall rigid device height dimension, "a". This overall height dimension "a" is configured to be tall enough to exceed the height of the yogurt inside the container in which the yogurt was made yet short enough to allow the container lid to securely close.

In FIG. 6, dimension "b" defines the thickness of the top circumferential rim section of the device—the cross section of which is shaped like an upside-down capital letter "L". Dimension "d5" describes the outer diameter of this rim section that is used to grasp and transport the device into and out of the yogurt mass. The thickness dimension "b" is large enough to provide adequate strength and rigidity yet limited to avoid waste with respect to material usage.

In FIG. 6, dimension "d1" defines the inner diameter of the top circumferential rim section, and dimension "d2" describes the outer diameter of the lower portion of the upside down "L". The straining medium is to be inserted into a channel within upside down "L" and attached to this outer diameter of the upstanding flange 33. Dimension "c" describes the overall height of the top circumferential rim section.

In FIG. 6, dimension "f" defines the height of the device medium. The device height dimension "e" measured from the bottom of device defines the height of a solid-walled, non-filtering section of the device of the present invention having a solid bottom incorporated thereinto similar to a common measuring cup. This section "h" is of solid construction to prevent leakage of previously filtered whey back into the yogurt when removing the straining or filtering device of the present invention from the yogurt mass. The height of this solid non-perforate section is configured to adequately contain the remaining whey not collected by the ladle. This solid, i.e., non-perforate, section having a bottom is placed around and attached to the outer diameter of the lower portion of the device medium described by dimension "d3". Dimension "d4" describes the outer diameter of the solid section with bottom.

In FIG. 6, "g" depicts the area of the device covered by a straining medium having a micron count that allows the liquid whey to pass therethrough while blocking the more solid yogurt.

Figure 7:
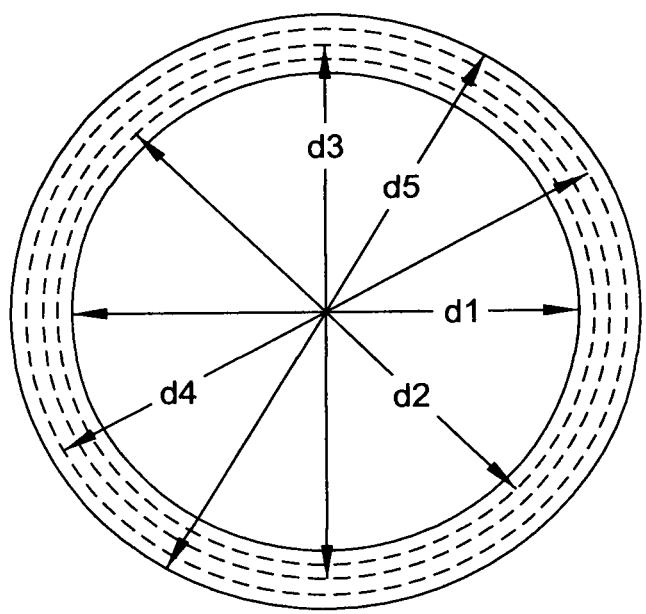
FIG. 7 depicts a top view diagram illustrating a preferred embodiment of the device of the present invention.

The FIG. 7 straining device top view diagram defines the diameters of the device of the present invention. Dimension "d1" defines the inner diameter of the top circumferential rim section having an upside-down capital letter "L"-shaped cross section.

Dimension "d2" defines the outer diameter of the lower portion of the upside-down capital letter "L"-shaped cross section into which the straining medium is to be inserted.

Dimension "d3" defines the outer diameter of the device medium, around which the solid section having a bottom wall is positioned and fastened.

Dimension "d4" defines the outer diameter of the solid section having a bottom wall.

Dimension "d5" defines the outer diameter of the top circumferential rim section.

Figure 8:
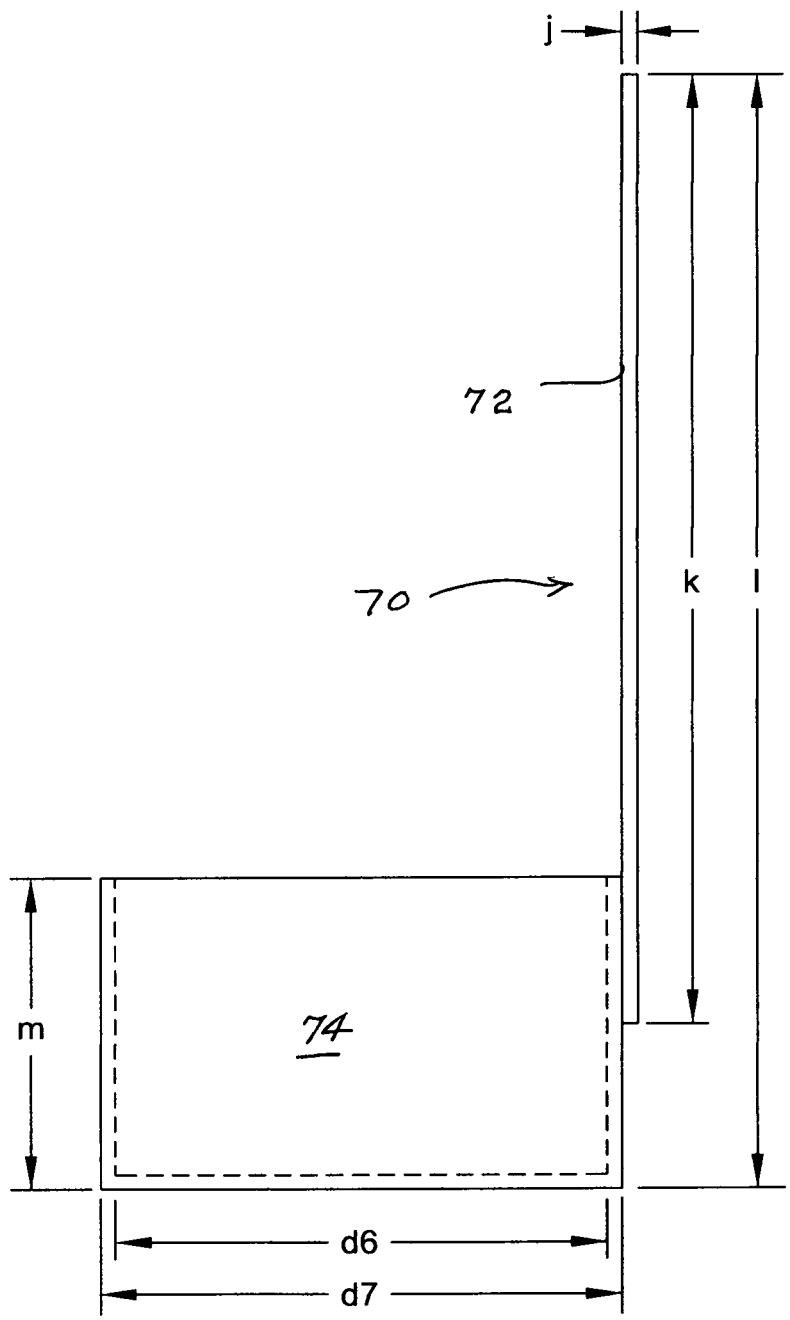
FIG. 8 depicts a side view diagram illustrating a preferred embodiment of the accompanying ladle.

In the FIG. 8 ladle side view diagram, dimension "1" (lower case letter "L") defines the overall height of the ladle that is greater than the straining device front/side view dimension "a" in FIG. 6. The ladle height is a measurement greater than dimension "a" to enable grasping the ladle for retrieval and removal of the filtered whey.

The dimension "k" defines the height of the ladle handle that attaches to the ladle reservoir below. The thickness of the ladle handle is defined by dimension "j".

Dimension "m" defines the height of the ladle reservoir.

Dimension "d6" defines the inner diameter of the ladle reservoir, and dimension "d7" defines the outer diameter of the ladle reservoir.

Figure 9:
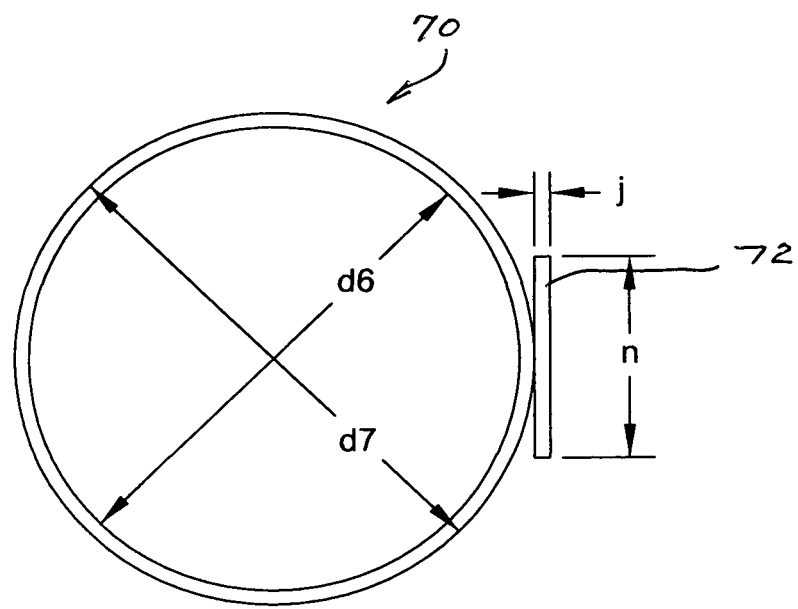
FIG. 9 depicts a top view diagram illustrating a preferred embodiment of the accompanying ladle.

In the FIG. 9 ladle top view diagram, the dimension "n" defines the width of the ladle handle. This ladle handle is configured to be wide enough to grasp yet narrow enough to avoid interfering with the straining device top circumferential rim section inner diameter, that is, dimension "d1" in FIG. 6. Dimension "j" again describes the thickness of the ladle handle.

The "d6" dimension defines the inner diameter of the ladle reservoir, and dimension "d7" defines the outer diameter of the ladle reservoir.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. The process of removing whey from a yogurt mass that is undergoing or has completed fermentation and includes a mixture of both solid yogurt and liquid whey by using a strainer, the yogurt mass being contained within an open top container and the yogurt mass having an upper surface, the strainer having an imperforate bottom wall in turn having an upper surface that in part defines a collection platform for whey, the strainer further including side walls which upwardly extend from said bottom wall and in turn terminate in an open top, said side walls including a major perforate portion; comprising forcing the strainer downwardly through the upper surface of the yogurt mass and into the yogurt mass through the open top of the container so that said major perforate portion of the strainer side walls contact the yogurt mass but the open top of the strainer is positioned above the upper surface of the yogurt mass within the container whereby at least a portion of the liquid whey within the yogurt mass is forced through said major perforate wall portion into the strainer and onto said collection platform, and thereafter removing whey from said collection platform through the top opening of the strainer.

2. The process of claim 1 wherein the whey is removed periodically.

3. The process of claim 1, including placing a lid on the container to cover the yogurt mass, said cover positioned above the strainer open top.

4. The process of claim 3, said lid having a bottom surface and the strainer open top contacting said lid bottom surface to stabilize said strainer position in the yogurt mass.

5. The process of claim 1, comprising forcing the strainer downwardly into the yogurt mass so that the strainer extends almost entirely into the yogurt mass and the strainer having an imperforate bottom wall from which side walls upwardly extend and in turn said side walls including a minor imperforate portion upwardly extending from said bottom wall so as to form a whey receiving cup.

6. The process of claim 1 wherein, the major perforate portion of said side walls of the strainer is at least in part formed by a filter mesh having openings sufficient to allow liquid whey therethrough but block solid yogurt.

* * * * *